March 28, 1944. E. A. KOREVEC 2,345,054
LIQUID LEVEL INDICATOR
Filed July 18, 1942
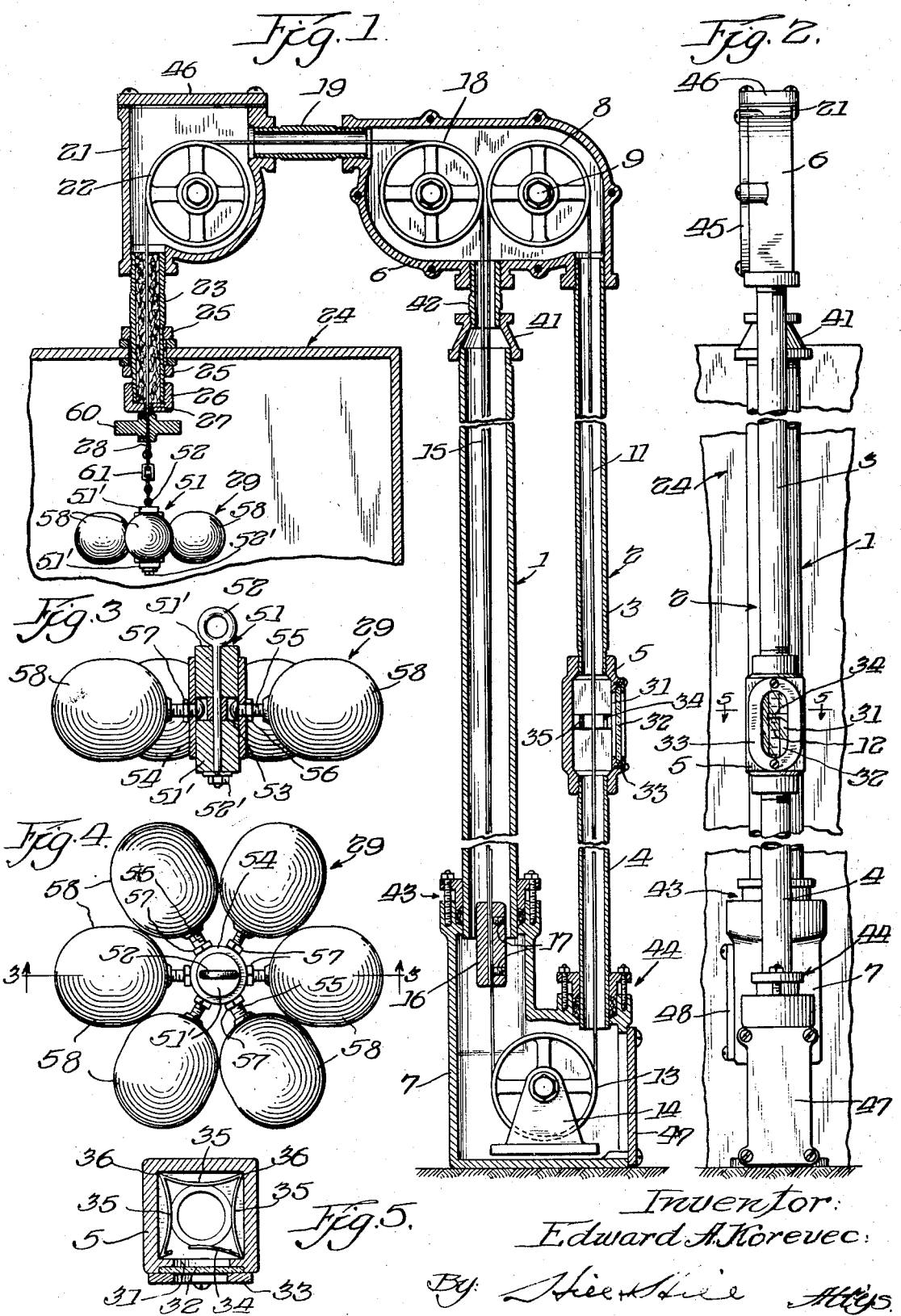
Inventor:
Edward A. Korevec Patented Mar. 28, 1944

2,345,054

UNITED STATES PATENT OFFICE 2,345,054

LIQUID LEVEL INDICATOR

Edward A. Korevec, Joliet, Ill., assignor of one-half to Leo M. Herkert, Joliet, Ill.

Application July 18, 1942, Serial No. 451,487

4 Claims. (Cl. 73—321)

The invention relates generally to indicating devices and more particularly to a direct reading tape indicator for tanks and the like.

The invention has among its objects, the production of a tape indicator of relatively simple construction durable and dependable in operation, and which is relatively inexpensive to manufacture.

A further object of the invention is the production of such an indicator in which separate reading and driving tapes are employed, the reading tape being provided with large legible markings and never entering the tank or fluid being measured.

Another object of the invention is the production of such an indicator which is very smooth and positive in operation, resulting in direct accurate readings.

A further object of the invention is the production of such an indicator which is relatively unaffected by temperature changes.

A further object is the production of a novel float construction which eliminates the necessity of float anchorage and has a relatively large displacement power.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing wherein like reference characters indicate like or corresponding parts, Fig. 1 is a sectional view of an indicating device embodying the present invention;

Fig. 2 is an end elevational view of the same;

Fig. 3 is a sectional view of the novel float construction taken approximately on line 3—3 of Fig. 4;

Fig. 4 is a top plan view of the float; and

Fig. 5 is a sectional view taken approximately on the line 5—5 of Fig. 2 illustrating the indicating means.

In the past there have been numerous types of tape indicators, some of which were direct reading, that is, the tape itself was graduated so that a reading could be taken directly from the tape. This tape extended into the tank and was connected at the end therein to a float, and at the opposite end to a suitable counterpoise. As substantially the entire tape entered the tank, the tape was subjected to vapors, etc., which in the case of certain liquids, would have a corrosive action thereon, and this corrosive action oftentimes reduced the legibility of the graduations, making it difficult to obtain a reading.

In the present construction, two tapes are employed, one the reading tape which is in the form of an endless loop positioned outside of the tank or other container, and the other the driver tape, one end of which is secured to the reading tape and the other end of which is positioned in the tank and connected to a suitable float or the like. Thus the graduated reading tape never enters the tank, and consequently is not under the constant action of corrosive vapors, etc.

Referring to the drawing, 1 represents a vertical tubular column and 2 a second tubular column extending parallel to the column 1, the column 2 being divided into two sections 3 and 4 joined by a suitable connecting member 5. The columns 1 and 2 are connected at their upper and lower ends by housings 6 and 7, respectively. Carried by the housing 6 is a tape wheel 8, the latter being supported on a suitable spindle 9 or the like with the tape wheel preferably mounted on ball bearings or other antifriction means. Carried by the tape wheel 8 is a reading tape 11 having graduations 12 thereon as indicated in Fig. 2, the tape 11 being suitably constructed to form an endless loop positioned in the respective housings and columns. The lower end of the loop, positioned in the housing 7, passes around a tape wheel 13, similar to the tape wheel 8, which is journaled in a floating standard 14, the wheel 13 and standard 14 being suspended by the tape 11, so that the tape is tensioned by the wheel 13 and the standard 14.

Also positioned in the tubular column 1 is a driver tape 15 which is secured to the tape 11 by a counterweight 16, the tapes being clamped to the counterweight by set screws 17 or other suitable means. The tape 15 extends up into the housing 6, passing over a tape wheel 18 similar to the tape wheels 8 and 13, thence through a connecting pipe or tube 19 into an elbow housing 21 and over a tape wheel 22 journaled therein. The housing 21 is connected to the tank through a coupling pipe or tube 23, threaded at one end into the housing 21, with the other end extending into the tank 24 and secured thereto by suitable collars 25, the end of the pipe 23 being provided with a cap 26 having a slot 27 therein through which the tape 15 extends. The pipe 23 is preferably filled with a suitable felt material which acts as a wiper element to remove moisture from the tape as it passes into the housing 21 through tube 23.

The connecting member 5 is provided with a window opening 31 covered by a piece of transparent material 32, through which a portion of the tape is visible, the transparent member 32 being held in position by a suitable plate member 33 secured by screws or the like to the member 5.

In operation, as the float 29 falls, the tape 15 will be moved in a direction to draw the counterweight 16 upward, thereby simultaneously moving the reading tape 11 over the tape wheels 8 and 13, and by reading the tape through the window 31, an accurate indication of the amount of liquid in the tank may be readily determined. It will be noted that the direction of movement of the reading tape 11 past the window 31 is the same as the direction of movement of the float 29 thus tending to preclude errors in reading the tape to determine whether float is rising or falling. The free end 28 of the tape 15 as hereinafter described is connected to a float indicated generally by the numeral 29, which is adapted to float upon the surface of the liquid, rising and falling therewith.

Obviously, the tape 11 may be graduated in any suitable units. To facilitate the reading of the tape, an indicating pointer 34 is provided, the latter taking the form of a generally rectangular shaped spring element which is flexed as indicated at 35, so that the corners 36 of the element will frictionally engage the inside corners of the connecting member 5, thus securely holding the pointer 34 in proper position. This construction readily permits manual adjustment of the pointer 34 when required, and eliminates the necessity of an anchor hole for the pointer in the connecting member 5 and danger of vapor leakage.

As illustrated in Figs. 1 and 2, the tubular column 1, in the present instance, is secured to the housing 6 by means of a reduction collar 41 and nipple 42, the lower end of the column 1 and the lower end of the pipe 4 being secured to the housing 7 by suitable packing glands indicated generally by the numerals 43 and 44, respectively. The housings 6 and 21 are each provided with a cover plate 45 and 46, respectively, which permits access to the interior of the housings, while the housing 7 is provided with cover plates 47 and 48 for the same purpose.

The float 29 comprises a supporting member 51 to which is secured an eye-bolt 52, the supporting member 51 being built up of two cylindrical blocks 51' connected by a sleeve member 53 of less diameter than the blocks 51', the eye-bolt 52 and nut 52' successively maintaining the sleeve and blocks in assembly relation. Rotatably carried by the supporting member 51 is a tubular member 54 having bolts 55 radially extending therefrom with respect to the axis of rotation of the member 54, the heads 56 of the bolts 55 being positioned adjacent the sleeve member 53, whereby the heads prevent axial longitudinal movement of the member 54 relative the supporting member 51, but permit free rotation between the two. The bolts 55 are secured in place by nuts 57 and are each provided at their free ends with a hollow float member 58, the latter being more or less spherical in shape. I have also shown a counterweight 60 and swivel 61 interposed between the end 28 of driver tape 15 and the float 29, the weight of counterweight 60, being substantially the same as counterweight 16. This will keep the driver tape 15 taut at all times independently of the weight of the float and due to its inherent inertia will tend to reduce or oppose any tendency of the tape to twist because of possible float rotation due to liquid surge. The swivel 61 likewise tends to reduce the tendency of any float rotation twisting the tape. Due to the novel arrangement of the assembly and construction of the float 29 any possibility of twisting of the tape 15 is eliminated, and the spherical construction of the float members 58 eliminates wandering of the float from true vertical travel, as a result of the substantial elimination of so called "bottom drag," generally found in other floats.

It will be noted that due to the double or dual tape construction in conjunction with the floating tape wheel 13, temperature changes resulting in expansion or contraction of the tapes will have substantially no effect upon the accuracy of the readings, this being due to the fact that both tapes will expand or contract simultaneously, with the weighted standard 14 maintaining the reading tape taut at all times. In contrast to this is a prior single tape construction wherein expansion and contraction of the tape will result in definite inaccuracies in the readings.

It will be apparent from the above description that I have produced a novel indicator construction which is positive in action and wherein the reading tape does not enter the tank or the container, and smooth positive action is achieved resulting in accurate, dependable readings.

It will also be noted that I have provided a novel float construction wherein anchorage of the float is eliminated and wherein the float is at all times free to rotate with respect to the tape.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In an indicating device, the combination of a pair of parallel substantially vertical tubular members connected at each of their respective ends by a housing member, the upper housing member having a pair of tape wheels, an endless graduated reading tape passing over one of said wheels and through said tubular members and lower housing, one of said members having a transparent portion through which the graduations on said tape are visible, a tape wheel positioned in said lower housing and supported by the reading tape, a weight member carried by the last mentioned tape wheel for added tensioning of said tape, a driver tape passing over said second tape wheel and then downwardly adjacent a portion of said reading tape and secured thereto, a counterweight carried by said portion of the reading tape, an elbow housing laterally spaced from said upper housing, a tape wheel rotatably mounted therein, tubular means connecting said elbow housing with said upper housing and with a fluid container, said driver tape extending from said second tape wheel through said tubular means and over the tape wheel in said elbow housing into said container, and a float in said container secured to the adjacent end of said driver tape.

2. In a liquid level indicating device of the kind described for containers, the combination of an endless graduated reading tape, a pair of spaced tape wheels between which said tape extends, a housing for said tape having a window therein through which a portion of the graduations on said tape are visible, a driver tape passing over a tape wheel positioned adjacent one of said first mentioned tape wheels and connected at one end to said reading tape, with the adjacent portion extending substantially parallel to said reading tape, the opposite end of the driver tape extending into said container, float means and counterweight means secured adjacent to one end of the driver tape, and a counterweight secured to the other end of the driver tape and to the reading tape for actuating said tapes.

3. In a device of the kind described for indicating liquid levels in tanks and in combination, an endless reading tape and means for movably supporting the same, a driver tape connected to the reading tape and of a length to extend into said tank, supporting means for said driver tape, a weighted tensioning means for said reading tape, said tape supporting means being so disposed that the indicating portion of the reading tape and the portion of the driving tape within the tank travel in the same direction upon variation of the fluid level of the liquid within the tank, a counterweight for the reading tape and adjacent end of the driver tape, a counterweight for the other end of the driving tape, a float member and swivel arranged on the other end of said driver tape, the counterweight and swivel being interposed between the float and tape.

4. In an indicating device the combination of a pair of vertical tubular members, one of which has a transparent portion therein, housing members, one connecting the upper ends of said tubular members and one connecting the lower ends thereof, a tape wheel journalled in the upper housing, an endless reading tape trained over said tape wheel, a suspended weighted tape wheel carried by said endless reading tape and functioning to tension the same, a pair of driver tape wheels journalled in said upper housing, a driver tape having a part extending parallel with the reading tape in one of the tubular members, and secured at one end to said reading tape, said driver tape being trained over said pair of driver tape wheels and extending into a tank, a counterweight secured to the reading tape adjacent the first mentioned end of the driver tape, a float and a counterweight carried by the other end of the driver tape within the tank, said first mentioned counterweight serving to move said reading tape in both directions.

EDWARD A. KOREVEC.